United States Patent [19]

Haisma et al.

[11] Patent Number: 4,571,616
[45] Date of Patent: Feb. 18, 1986

[54] DEVICE FOR DISPLAYING THREE-DIMENSIONAL IMAGES

[75] Inventors: Jan Haisma; Gijsbertus Bouwhuis, both of Eindhoven, Netherlands

[73] Assignee: U.S. Philips Corporation, New York, N.Y.

[21] Appl. No.: 508,221

[22] Filed: Jun. 27, 1983

[30] Foreign Application Priority Data

Jul. 21, 1982 [NL] Netherlands ............... 8202934

[51] Int. Cl.$^4$ ............................................. H04N 9/58
[52] U.S. Cl. ...................................... 358/88; 358/901; 352/61
[58] Field of Search ............... 358/3, 88, 901; 352/61

[56] References Cited

U.S. PATENT DOCUMENTS 3,473,872 10/1969 Okamura ........................... 358/88
4,214,257 7/1980 Yamauchi ........................... 358/3

Primary Examiner—Howard W. Britton
Attorney, Agent, or Firm—Joseph P. Abate

[57] ABSTRACT

In a device for displaying three-dimensional pictures, N (with $N = 2, 3, 4 \ldots$) recorded images corresponding to different spatial observation positions are displayed on one or more intermediate display screens (3, 4, 5, 82, 83, 84). The device comprises a viewing screen (6) having lens elements (20, 30) via which corresponding picture segments of the recorded images are displayed. An optical coupling (8, 44) having a plurality of light conductors (8) exists between the viewing screen and the intermediate display screen(s). The light conductors unambiguously associate groups of N corresponding picture segments with lens elements of the viewing screen. By means of the device, three-dimensional pictures can be observed without further auxiliary means for the viewer.

17 Claims, 15 Drawing Figures

DEVICE FOR DISPLAYING THREE-DIMENSIONAL IMAGES

BACKGROUND OF THE INVENTION

The invention relates to a device for displaying three-dimensional images in which N recorded images corresponding to N various spatial observation positions are displayed on one or more intermediate display screens and corresponding picture segments of the recorded images are displayed via a lens element of a viewing screen.

Such a device is disclosed in U.S. Pat. No. 4,214,257. In said specification, two recorded images are displayed on a color display screen of a cathode ray tube, the first recorded image being displayed by the odd field lines and the second recorded image being displayed by the even field lines. Each recorded image is built up from picture segments consisting of vertical image strips and the corresponding image strips of the recorded images are displayed in pairs via a viewing screen of vertical cylinder lenses. By associating each pair of corresponding image strips with a vertical cylinder lens of the viewing screen, it can be achieved that a viewer views the first recorded image with his left eye and views the second recorded image with his right eye. In this manner, a stereoscopic image is presented to the viewer by which three-dimensionality of the recorded scene is evoked perceptively.

However, in order to obtain a good stereoscopic image, it is necessary for an unambiguous relationship to exist between each pair of corresponding image strips and the lens element which is associated with said pair. This means that stringent requirements are imposed upon the accuracy with which the image strips are in registration with the vertical cylinder lenses.

In the known device, the picture selection is controlled electronically per field line and the place which the vertical image strips occupy on the intermediate display screen is determined by a shadow mask placed before the intermediate display screen. The electron beams, upon writing the odd field lines, display only the picture information of the first recorded image and, upon writing the even field lines, display only the picture information of the second recorded image on the intermediate display screen. In this manner, pairs of corresponding vertical image strips are displayed beside each other on the intermediate display screen. In this manner, however, it is particularly difficult to get the pairs of corresponding vertical image strips also in registration with the vertical cylinder lenses of the viewing screen.

Furthermore, in the known device, the viewing screen also forms an enveloping part of the cathode ray tube and should consequently have sufficient thickness of the required rigidity. The focal length of the cylinder lenses, however, then is approximately equal to the thickness of the viewing screen because the focal planes of the cylinder lenses coincide approximately with the intermediate display screen which in the known device is formed by a phosphor screen. However, a large focal length has for its result that when the viewer's head is displaced slightly in a direction transverse to the longitudinal direction of the cylinder lenses (i.e. the horizontal direction), picture reversal occurs from orthoscopic to pseudoscopic, which is experienced as annoying. In order to increase this so-called viewing angle, cylinder lenses of comparatively large transverse dimensions should be used, which, of course, is associated with loss of picture definition. These problems become even larger when three or more recorded images are used to produce a three-dimensional display which better corresponds to reality.

SUMMARY OF THE INVENTION

It is an object of the invention to provide a device for displaying three-dimensional pictures in which groups of corresponding picture segments of the recorded images are unambiguously associated with lens elements of the viewing screen while using simple means.

A further object of the invention is to provide a device which allows the viewer an acceptable freedom of movement without picture reversal from orthoscopic to pseudoscopic occurring.

In accordance with the present invention a device for displaying three-dimensional images in which N recorded images corresponding to various spatial observation positions are displayed on one or more intermediate display screens and corresponding picture segments of the recorded images are displayed via a lens element of a viewing screen is characterized in that an optical coupling exists between the intermediate display screen(s) and the viewing screen, which coupling comprises a plurality of light conductors which unambiguously associate groups of N corresponding picture segments with lens elements of the viewing screen.

By means of the light conductors, an unambiguous display is obtained on the viewing screen of the picture segments displayed on the intermediate display screen(s). Furthermore, the light conductors can be accurately positioned with respect to an intermediate display screen and with respect to the viewing screen.

It is to be noted that U.S. Pat. No. 3,043,179 disclosed a device for displaying stereoscopic images in which corresponding picture segments of two recorded images are displayed via light conductors terminating in a plane. However, the device does not comprise a viewing screen with lens elements but operates according to the so-called anaglyphs method in order to be able to view the two recorded images separately. This method involves that the recorded images are displayed in two different colors (for example, red and green), in which the separation of the images desired for the eyes of the viewer is obtained by means of a suitable color filter (for example, red and green) placed before each eye of the viewer. However, colour pictures cannot be observed stereoscopically according to this method and it is not possible to use more than two recorded images. Moreover, the use of auxiliary means, for example, in the form of glasses, is experienced as annoying by the viewer. The device according to the invention can use more than two recorded images without any objection, as a result of which the perceptively evoked three-dimensionality better approaches the natural way of seeing depth.

According to an embodiment of the invention the viewing screen has mechanical means for unambiguously positioning groups of light conductors arranged according to a previously determined pattern with respect to lens elements of the viewing screen associated with said groups.

According to a further embodiment of the invention said mechanical means are formed by aubtting walls provided on the viewing screen. Said abutting walls position the light conductors with respect to the lens elements of the viewing screen in such manner that each group of N corresponding picture segments is always associated unambiguously with a relevant lens element of the viewing screen. The abutting walls may be formed, for example, by the side walls of recesses, cavities or grooves provided in the viewing screen. The abutting walls may also be formed by projections provided on the viewing screen in the form of, for example, bosses, dimples or partitions. The lens elements of the viewing screen may be arranged according to vertical columns. The lens elements may consist of spherical lenses or cylinder lenses. In the case of cylinder lenses, the arrangement is preferably such that together they constitute a pattern of juxtaposed vertically extending cylinder lenses (lenticular screen).

According to a further embodiment of the invention an optical contact exists between the light conductors and the viewing screen so that no picture distortions occur at the interface between the viewing screen and the ends of the light conductors facing same. This optical contact can be obtained, for example, by means of immersion. Said immersion can be realized, for example, by means of a light transparent paste or lacquer which, after producing the optical contact, may be cured.

A further embodiment of the invention is characterized in that the light conductors are arranged in flat bundles which lie in vertical planes at the viewing screen and are juxtaposed in the horizontal direction, in which N corresponding vertical image strips of the N recorded images are always transferred to the viewing screen in a cyclically repeated sequence as juxtaposed vertical image strips. An advantage of light conductors arranged in flat bundles is that all light conductors associated with a picture segment consisting of a vertical image strip can be positioned in one operation. Furthermore, the positioning of the light conductors in a horizontal direction is reduced to a cyclic arrangement of the planes in which the bundles are situated. In this manner, complicated braiding technics of the light conductors for the manufacture of the device are avoided.

Using these light conductors arranged in flat bundles, a first embodiment of the device is characterized in that each of the recorded images is displayed on a separate intermediate display screen and the corresponding vertical image strips of the recorded images are transferred to the viewing screen in a cyclically repeated sequence as juxtaposed vertical image strips by means of the light conductors arranged in flat bundles, said sequence corresponding to the spatial sequence of the N different spatial observation positions. A second embodiment is characterized in that the corresponding vertical image strips of the recorded images are ordered electronically in such manner that these are displayed on an intermediate display screen in cyclically repeated groups of N corresponding vertical image strips, the sequence of the image strips in each group of N image strips corresponding to the spatial sequence of the N different spatial observation positions.

In addition to the already mentioned light conductors, the optical coupling between the viewing screen and an intermediate display screen may comprise optical means which display the image displayed on the intermediate display screen in a plane in which the ends of the light conductors facing the intermediate display screen in question are situated. By displaying the image displayed on an intermediate display screen on the inputs of the light conductors associated with said intermediate display screen, cross-talk of the picture segments is prevented. Such a cross-talk occurs, for example, when the intermediate display screen is provided on a normal light transparent face plate of a display tube. As a result of the required thickness of the face plate, light originating from a picture segment of the intermediate display screen cannot be prevented from impinging on light conductors not associated with said picture segment. This problem no longer occurs in an optical display as described above. The said optical means may consist, for example, of a lens or a system of lenses. According to still a further embodiment of the device, each intermediate display screen is provided on a fibre plate. Said fibre plate may also form the face plate of a display tube. In this case, the light conductors may terminate directly on the fibre plate because the fibre plate itself excludes cross-talk between various picture segments. When the corresponding picture segments of the recorded images are displayed on the intermediate display screen in the desired sequence by electronic switching, it is also possible when using a fibre plate to provide the viewing screen directly on the fibre plate. In that case, the light conductors are formed by the fibre plate itself.

The field of application of the device is not restricted to recorded images which are produced by electromagnetic radiation. The device may also be used when the recorded images are produced by corpuscular radiation or acoustic waves. The device according to the invention can also be used in synthetically obtained recorded images, for example, computer-generated recorded images, so as to obtain a three-dimensional display. This may be of importance in graphic display.

According to the invention, the information with which the recorded images are obtained or from which the intermediate images can be generated on the intermediate display screen can be stored on one or more information carriers, for example a disk or a tape. This may be of importance in particular when more than two recorded images are used because the amount of information which is to be transferred, for example, from a transmitter to a receiver, might require too much band width in the case of more recorded images.

BRIEF DESCRIPTION OF THE DRAWINGS

The invention will now be described in greater detail, by way of example, with reference to the accompanying drawings, in which.

DETAILED DESCRIPTION OF THE PREFERRED EMBODIMENTS

Figure 1:
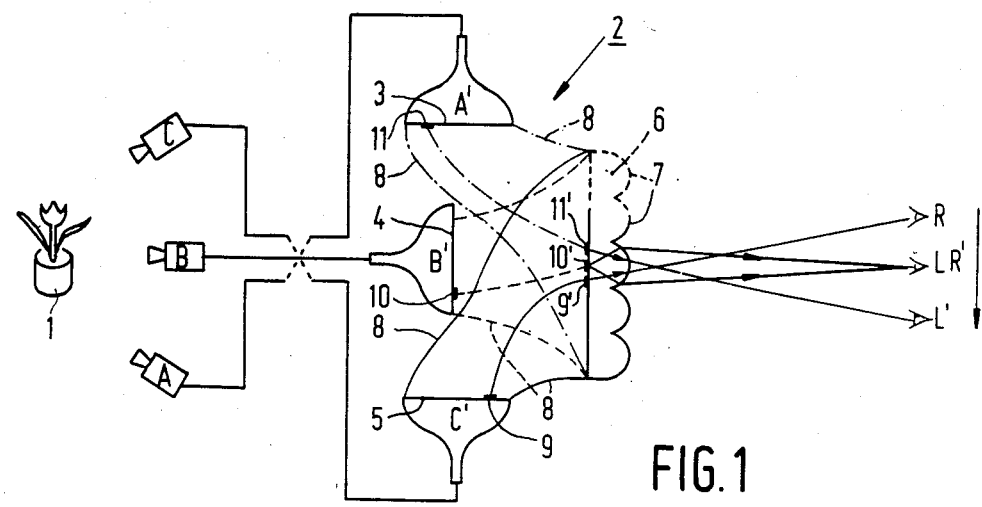
FIG. 1 shows diagrammatically the recording and display sides for three (N=3) recorded images and illustrates the principle of operation of the device made in accordance with the present invention.

The arrangement shown in FIG. 1 comprises three cameras A, B and C on the recording side which cameras are directed on object 1 to be displayed from three different spatial observation positions. The three recorded images of the cameras A, B and C are transferred to a display device 2. The display device 2 comprises three display tubes A', B' and C' each comprising a respective intermediate display screen 3, 4 and 5. The recorded image of camera A is displayed on the intermediate display screen 3 of display tube A', that of camera B on the intermediate display screen 4 of display tube B' and that of camera C on the intermediate display screen 5 of display tube C'. The intermediate display screens 3, 4 and 5 each consist of a pattern of phosphor dots or phosphor strips luminescing in the colors red, green and blue, so that color pictures can be displayed with the display tubes A', B' and C'. The display tubes A', B' and C' may be normal color display tubes, for example, those of the type having shadow masks. The display tubes A', B' and C' may, alternatively, be monochromatic display tubes. The device 2 furthermore comprises a viewing screen 6 having lens elements 7 arranged according to columns. In the FIG. 1, the direction of the columns is perpendicular to the plane of the drawing. The cameras A, B and C are accommodated in the plane of the drawing.

An optical coupling consisting of a plurality of light conductors is present between the viewing screen 6 and the intermediate display screens 3, 4 and 5. Each light conductor 8 transfers a picture segment of the recorded images displayed on the intermediate display screens 3, 4 and 5 to the viewing screen 6 and that in such manner that corresponding picture segments 9, 10 and 11 are associated unambiguously as picture segments 9', 10' and 11' with one lens element 7 of the viewing screen 6. In this manner, all corresponding picture segments 9, 10 and 11 are transferred to the viewing screen 6 as triplets of picture segments 9', 10' and 11'. Each triplet is associated with a lens element the place of which corresponds to the places of the picture segments 9, 10 and 11 on the intermediate display screens 3, 4 and 5. A viewer the place of whose right eye R and left eye L is shown in the drawing receives via the viewing screen 6 in the right eye R substantially only the light rays originating from all picture segments 9' and in the left eye L substantially only the light rays originating from all picture segments 10'. In other words, the right eye R receives only the picture recorded by camera C and the left eye L receives only the picture recorded by camera B. As a result of this, a stereoscopic picture of the object 1 is perceptively evoked.

When the viewer moves his or her head in the direction indicated by the arrow a new situation will arise when the right eye has occupied the place R' and the left eye has occupied the place L'. In the new situation, the right eye receives only light rays originating from all picture segments 10' and the left eye receives only light rays originating from all picture segments 11'. In other words, in the new situation, the right eye receives only the picture recorded by camera B and the left eye receives only the picture recorded by camera A. No annoying reversal from orthoscopic to pseudoscopic viewing takes place within the indicated displacement of the viewer's head. On the contrary, the natural way of spatial viewing is better approached by the device described.

Figure 2A:
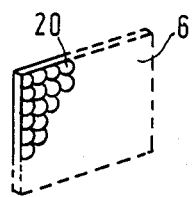
FIG. 2a shows a viewing screen with spherical lens elements.

As shown in FIG. 2a the viewing screen 6 may comprise an array of spherical lenses 20. In that case, the sensation of spatial viewing is experienced not only on the horizontal direction but also in the vertical direction. In FIG. 1, the number of cameras must then be extended, for example, to nine in an arrangement of three rows of each three cameras placed one on top of the other. In a manner analogous to that described with reference to FIG. 1, each time groups of nine corresponding picture segments of the 9 recorded images are associated with a spherical lens 20 instead of groups of three.

Figure 2B:
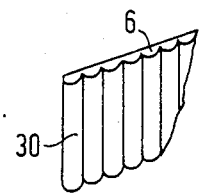
FIG. 2b shows a viewing screen with cylindrical lens elements which together constitute a pattern of juxtaposed continuous cylinder lenses.

In practice, however, spatial viewing in the horizontal direction only will reasonably suffice. In that case, a viewing screen 6 as shown in FIG. 2b will suffice. In this FIG. 2b, the viewing screen consists of vertical extending cylinder lenses 30 (lenticular screen). The picture segments 9, 10 and 11 shown in FIG. 1 and, hence, also the picture segments 9', 10' and 11' consists of vertical corresponding picture strips when the viewing screen 6 shown in FIG. 2b is used. Said picture strips 9', 10' and 11' then extend parallel to the cylinder lenses 30 and, hence, in FIG. 1 perpendicularly to the plane of the drawing. In that case, the arrangement of the light conductors 8 can also be realized in a conveniently arranged manner suitable from a point of view of manufacture.

Figure 3:
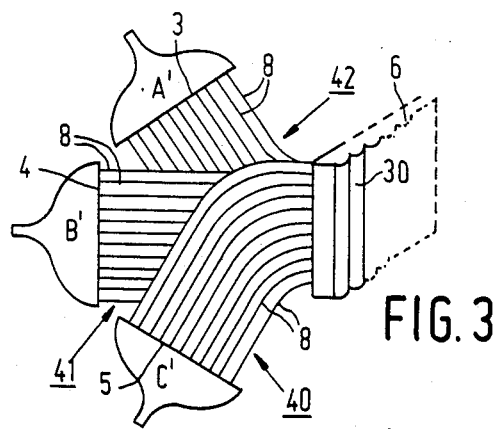
FIG. 3 shows an embodiment of the optical coupling between three separate intermediate display screens and a viewing screen built up from cylinder lenses.

FIG. 3 shows an embodiment for that case of the optical coupling between the viewing screen 26 and the three intermediate display screens. For clarity, the same reference numerals as in FIGS. 1 and 2b are used as much as possible for corresponding components. Shown are the three display tubes A', B' and C' with their respective intermediate display screens 3, 4 and 5. The light conductors are arranged in planes. Three bundle planes 40, 41 and 42 are shown. A first vertical image strip of the recorded image shown on the intermediate display screen 5 is transferred to the viewing screen 6 by means of bundle plane 40. In the same manner, corresponding first vertical image strips of the recorded images displayed on the intermediate display screens 4 and 3, respectively, are transferred to the viewing screen 6 by means of the bundle faces 41 and 42, respectively. These corresponding first image strips are associated beside each other with a first vertical cylinder lens 30 by the bundle faces 40, 41 and 42. By means of a second group of three bundle planes, corresponding second image strips are associated with a second vertical cylinder lens. This procedure is repeated cyclically until the corresponding last image strips of the recorded images displayed on the intermediate display screens have been transferred. The thickness of the face plates of the display tubes may have for its result that light originating from a picture strip is incident on the intermediate display screen in light conductors other than those destined for that purpose as a result of which undesired cross-talk occurs. This can be prevented in a simple manner by means of the arrangement shown in FIG. 4. As shown for the display tube B', all bundle planes 41 terminate in a flat or curved face 43 perpendicular to the plane of the drawing. The intermediate display screen 4 is displayed on the face 43 by means of a lens 44. In this manner, cross-talk of the image strips as a result of the thickness of the face plate 45 is prevented. This arrangement is, of course, also used for the display tubes A' and C'.

Figure 5:
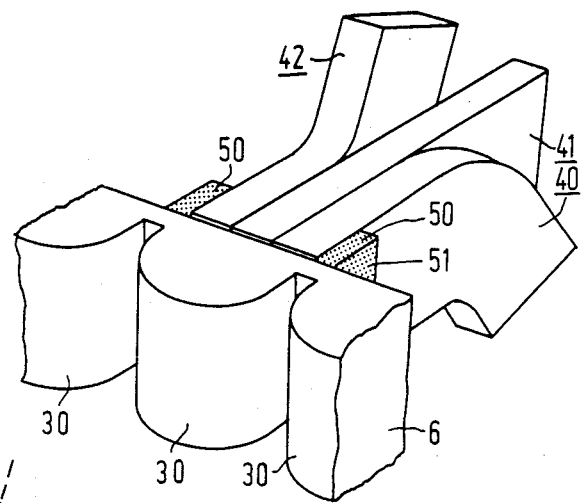
FIG. 5 shows an embodiment with mechanical positioning means for the light conductors.

FIG. 5 shows an embodiment in which mechanical means is provided for the unambiguous positioning of a group of three bundle faces 40, 41 and 42 with respect to a cylinder lens 30. The means consists of partitions 50 of a light transparent or light absorbing material. The partitions 50 form abutting walls 51 fixing the position of the bundle faces. For the embodiments described so far having three recorded images, groups of three bundle faces are thus positioned unambiguously with respect to the lens element 30. The construction shown is not drawn to scale. For determining the order of magnitude of the dimensions it is to be noted that the light conductors situated in the bundle planes have a cross-section of approximately 100 microns while the thickness of the partitions is approximately 25 microns. The light conductors, the partitions 50 and the viewing screen 6 may consist of glass or a synthetic resin. The focal length of the cylinder lenses 30 is approximately 1 mm.

Figure 6:
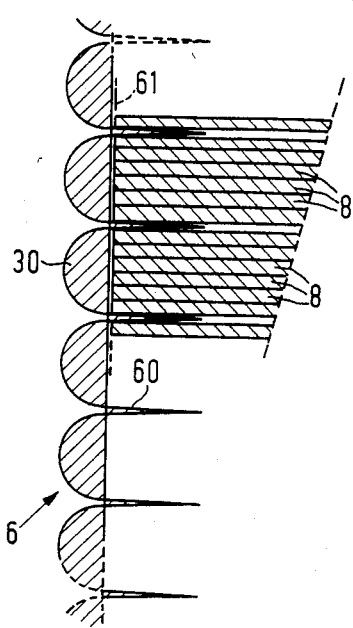
FIG. 6 shows another embodiment with mechanical positioning means.

In the FIG. 6 embodiment, the abutting walls 60 provided on the viewing screen 6 form one assembly with the viewing screen. Furthermore, instead of groups of 3, groups of 6 bundle faces are positioned for each cylinder lens. The light conductors in the bundle faces make optical contact with the viewing screen 6 so as to avoid interferences at the interface. This optical contact is produced by means of immersion via a layer 61 of a transparent lacquer provided on the viewing screen and cured, for example, by photopolymerization.

Figure 7:
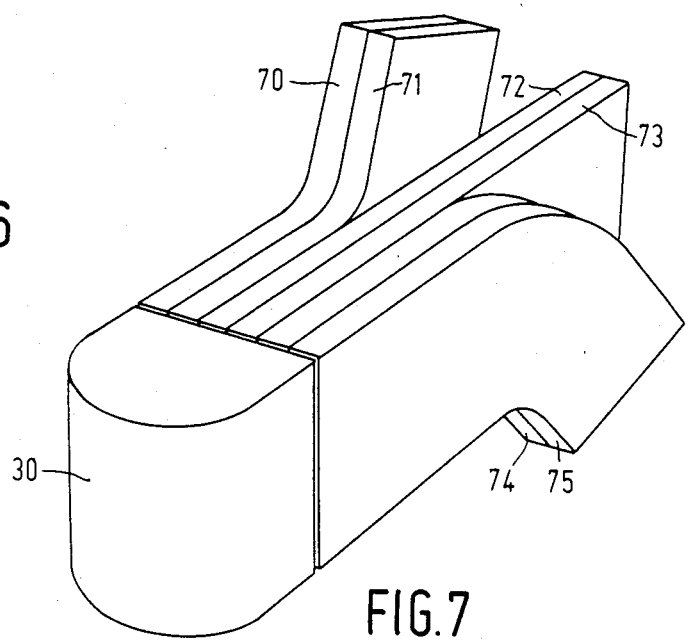
FIG. 7 shows an embodiment of light conductors arranged in planes.

In the embodiments described with reference to FIG. 1, each recorded image was displayed on a respective intermediate display screen. However, it is alternatively possible to display corresponding image strips of various recorded images on one or more intermediate display screens. The desired ordering of said image strips on the intermediate display screens can be obtained by electronic switching. For example, a first vertical image strip of a first recorded image can be displayed on a first intermediate display screen and beside it a first vertical image strip of a second recorded image may be displayed. A first vertical image strip of a third recorded image and a first vertical image strip of a fourth recorded image are displayed on a second intermediate display screen. In the same manner, the first vertical image strips of a fifth and a sixth recorded image are displayed beside each other on a third intermediate display screen. For displaying the corresponding second image strips, there is started again with the first intermediate display screen, then the second intermediate screen and then the third intermediate display screen. The arrangement of the intermediate display screens is that which is shown in FIG. 1 or FIG. 3 The optical coupling between the viewing screen and the intermediate display screens is shown in FIG. 7 for one cylinder lens 30. Advantageously, light conductors arranged in planes can again be used. The corresponding first vertical image strips of the first and second recorded images are transferred to the viewing screen by means of a bundle plane 70 and a bundle plane 71 of the first intermediate display screen. A bundle plane 72 and a bundle plane 73 transfer the corresponding first vertical image strips of the third and fourth recorded images, respectively, and the bundle face 74 and 75 do this is the same manner for the corresponding vertical image strips of the fifth and sixth recorded images. This is repeated cyclically for the corresponding second vertical image strips and then for the corresponding third, fourth, fifth . . . vertical image strips. The flat stacking of the bundle planes is also maintained in this case.

Figure 8:
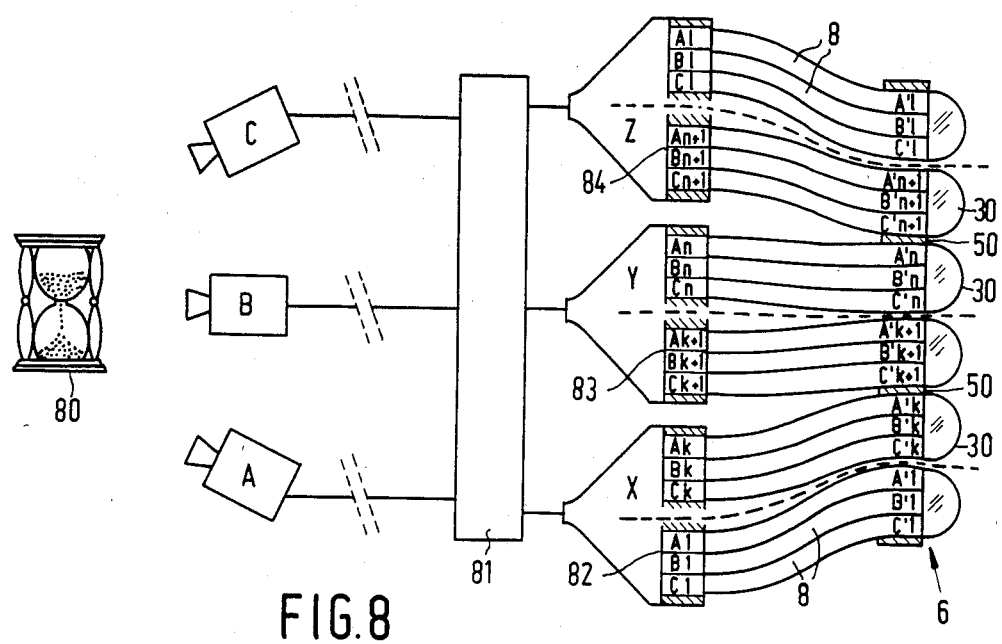
FIG. 8 shows diagrammatically another embodiment of the device in accordance with the invention.

FIG. 8 shows a slightly modified form of the embodiment described with reference to FIG. 7. An object is again recorded by means of the cameras A, B and C. The video signals of the cameras A, B and C are received in an electronic circuit 81 and the display tubes X, Y and Z are also controlled by means of the circuit 81. The tubes X, Y and Z are driven sequentially in which, proceeding from the left to the right (in the drawing from the bottom to the top) first the first vertical image strip C1 of cameras C, then the first vertical image strip B1 of camera B and then the first vertical image strip A1 of camera A are displayed on the intermediate display screen 82. The image strips A1, B1 and C1 are corresponding vertical image strips of the images recorded by the cameras A, B and C. The image strips A1, B1 and C1 are supplied to the first cylinder lens 30 of the viewing screen 6 as vertical image strips A1', B1' and C1' by means of the light conductors 8. In the present example, scanning may be carried out in the vertical direction in which, upon writing a vertical line, a vertical image strip is displayed on one of the respective intermediate display screens 82, 83 and 84. After displaying the vertical image strip C1, the electron gun, not shown, of the display tube X is driven for writing the image strip B1. The electron gun is then driven for writing the image strip A1. After the first triplet of corresponding image strips has thus been displayed, the second triplet of corresponding vertical image strips C2, B2, A2 is written on the intermediate display screen and so on until the last triplet of image strips Ck, Bk, Ak is displayed on the intermediate display screen 82. At that instant, display tube Y is driven in which the triplets of image strips Ck+1, Bk+1, Ak+1 up to and including the triplets of the image strips Cn, Bn, An are sequentially displayed on the intermediate display screen 83 in the manner corresponding to that of display tube X. Finally, the display tube Z is driven in the manner as described for display tube X and display tube Y, after which the cycle is repeated. The advantage of this embodiment is that the braiding of the flat bundles of light conductors 8, as described with reference to FIG. 3, becomes still simpler because the ordering of the image strips is produced electronically. The simple stacking of the vertical bundle planes against each other is shown directly in FIG. 8.

Figure 4:
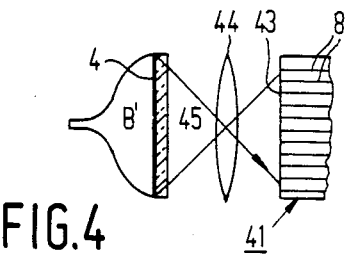
FIG. 4 shows an optical coupling according to the FIG. 3 arrangement in which a system of lenses is incorporated.

The optical coupling of the light conductors to an intermediate display screen can be realized by means of a system of lenses as described with reference to FIG. 4. An alternative possibility is to provide the intermediate display screens on a fibre plate. The optical coupling of the light conductors may possibly still take place via a system of lenses, but the application of a fibre plate also presents the possibility of directly coupling the light conductors to the fibre plate while forming an optical contact. A few embodiments of such a coupling are shown in FIGS. 9a to 9d.

Figure 9A:
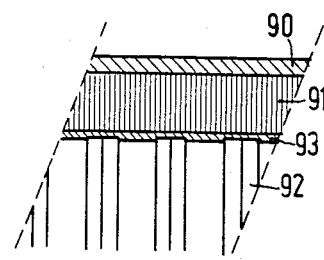
FIGS. 9a to 9d show different embodiments of an optical coupling of the light conductors to the intermediate display screen.
Figure 9B:
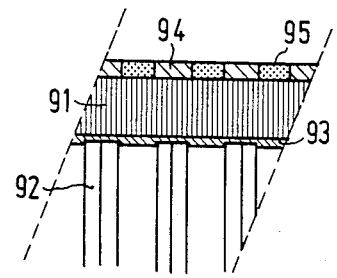
Figure 9C:
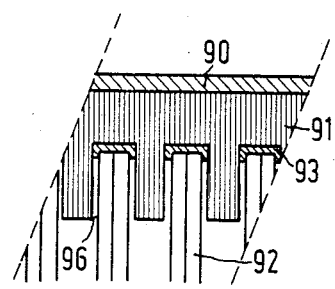
Figure 9D:
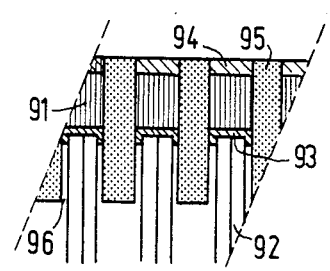
Figure 10:
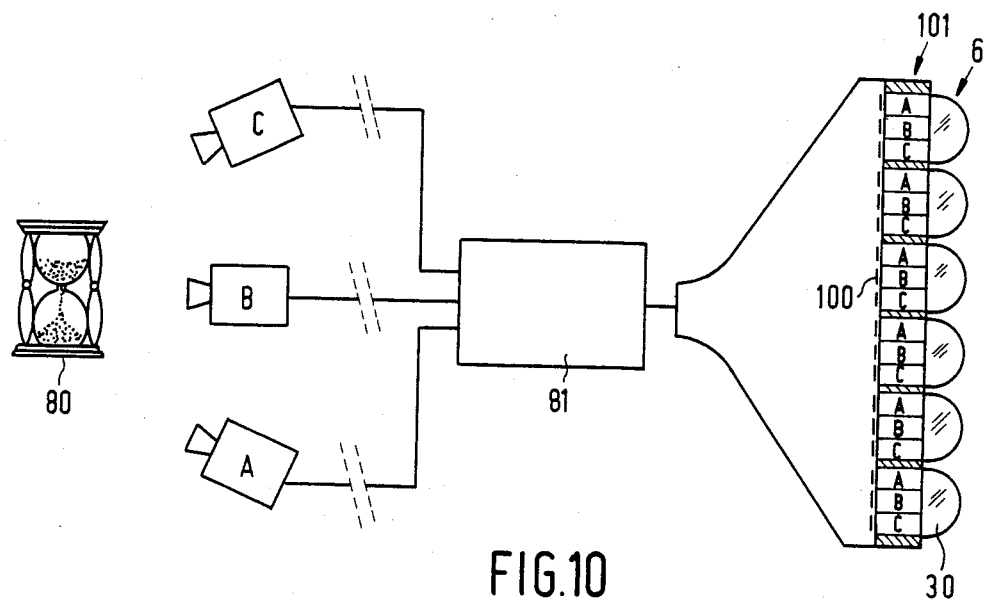
FIG. 10 shows a modification of the device shown in FIG. 8.

In FIG. 9a, the intermediate display screen 90 consists of a phosphor layer for displaying colored pictures or monochromatic pictures. The intermediate display screen is provided on a fibre plate 91. The light conductors 92 are in optical contact with the fibre plate 91 by means of a transparent layer 93 in the form of a paste or an ultra-violet radiation-curing lacquer or resin. FIG. 9b differs from FIG. 9a only in that, instead of a continuous phosphor layer 90, a layer of phosphor regions 94 surrounded by light absorbing regions 95 is provided on the fibre plate 91. Said light-absorbing regions 95 increase the contrast of the image displayed on the intermediate display screen. FIG. 9c differs from FIG. 9a in that for the positioning of the light conductors 92 grooves 96 are provided in the fibre plate 91. FIG. 9d shows an embodiment which shows both positioning grooves 96 and light-absorbing regions 95. A particular embodiment which is possible by the use of a fibre plate is shown in FIG. 10. The device shown resembles the FIG. 8 device considerably. The difference is, however, that only one intermediate display screen 100 and, hence, only one display tube is used. The intermediate display screen 100 is provided on a fibre plate 101 which also forms the face plate of the display tube. The viewing screen 6 is provided directly on the fibre plate 101. In fact, the light conductors 8 of the FIG. 8 device are replaced by the fibre plate 101. For the manner in which the device is driven, reference is therefore made to the description of the device given with reference to FIG. 8.

Figure 11:
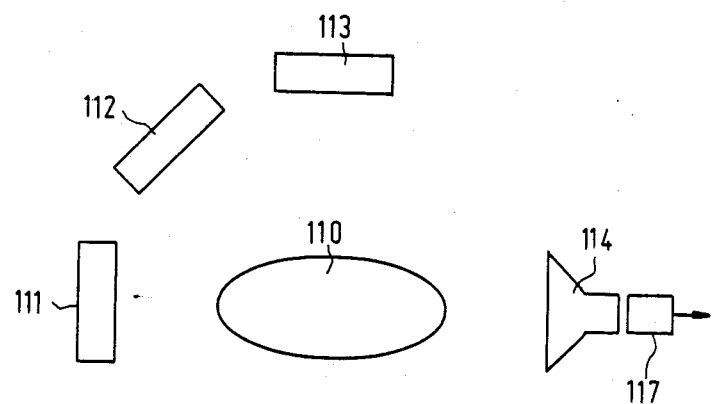
FIG. 11 shows a diagram of an arrangement for the three-dimensional display of X-ray recordings.
Figure 11:
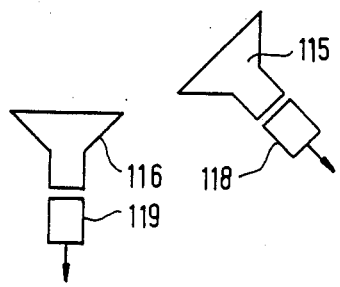

As already noted, the use of the device is not restricted to recorded images obtained by means of visible light. The path along which the intermediate images on the intermediate display screen are obtained plays no role for the device. For illustration, FIG. 11 gives an example in which the recorded images are obtained by means of X-ray radiation. An object 110 to be examined röntgenologically is irradiated by means of X-ray sources 111, 112 and 113. Opposite to the X-ray sources, three X-ray image intensifiers 114, 115 and 116 are arranged. The images obtained by means of the X-ray image intensifiers are again recorded by cameras 117, 118 and 119. From these cameras the further processing of the information is equal to the processing described with reference to preceding Figures. This means that the X-ray image can be observed in three dimensions.

What is claimed is:

1. A device for displaying three-dimensional images in which N recorded images corresponding to N various spatial observation positions are displayed on at least one intermediate display screen and in which corresponding picture segments of the recorded images are displayed through a lens element of a viewing screen, characterized in that the device further comprises an optical coupling disposed between the intermediate display screen and the viewing screen, the optical coupling including light conductors arranged such that the light conductors unambiguously associate a group of N corresponding picture segments with the lens element of the viewing screen.

2. A device as claimed in claim 1, characterized in that the viewing screen has mechanical means for unambiguously positioning the group of light conductors with respect to the lens element of the viewing screen.

3. A device as claimed in claim 2, characterized in that the mechanical means is formed by abutting walls provided on the viewing screen.

4. A device as claimed in claim 1, 2 or 3, characterized in that the viewing screen comprises lens elements arranged according to vertical columns.

5. A device as claimed in claim 1, 2, or 3, characterized in that the lens elements are spherical lenses.

6. A device as claimed in any of the claim 1, 2 or 3, characterized in that the lens elements are cylinder lenses which together constitute a pattern of juxtaposed vertically extending cylinder lenses.

7. A device as claimed in claim 1, 2 or 3, characterized in that the device farther comprises an optical contact disposed between the light conductors and the viewing screen.

8. A device as claimed in claim 1, 2 or 3, characterized in that the light conductors are arranged in flat bundles which, at the viewing screen, are situated in vertical planes and are juxtaposed in the horizontal direction, in which N corresponding vertical image strips of the N recorded images are always transferred in a cyclically repeated sequence to the viewing screen as juxtaposed vertical image strips.

9. A device as claimed in claim 8, characterized in that each of the recorded images is displayed on a separate intermediate display screen and the corresponding vertical image strips of the recorded images are transferred to the viewing screen in a cyclically repeated sequence as juxtaposed vertical image strips by means of the light conductors arranged in flat bundles, said sequence corresponding to the spatial sequence of the N different spatial observation positions.

10. A device as claimed in claim 8, characterized in that the corresponding vertical image strips of the recorded images are ordered electronically in such manner that these are displayed on an intermediate display screen in cyclically repeated groups of N corresponding vertical image strips, the sequence of the image strips in each group of N image strips corresponding to the spatial sequence of the N different spatial observation positions.

11. A device as claimed in claim 1, 2 or 3, characterized in that the optical coupling between the viewing screen and the intermediate display screen comprises optical means which displays the image displayed on the intermediate display screen on the ends of the light conductors facing the intermediate display screen.

12. A device as claimed in claim 1, 2 or 3, characterized in that each intermediate display screen is provided on a fibre plate.

13. A device as claimed in claim 12, characterized in that the viewing screen is directly connected to the fibre plate and the light conductors are formed by the fibre plate.

14. A device as claimed in claim 1, 2 or 3, characterized in that the recorded images are produced by means of X-ray radiation.

15. A device as claimed in claim 1, 2 or 3, characterized in that information for generating a three-dimensional image is stored on at least one information carrier.

16. A device as claimed in claim 15, characterized in that the at least one information carrier is an optical disk.

17. A device as claimed in claim 15, characterized in that the at least one information carrier is a magnetic tape.

* * * * *